(12) United States Patent
Wu

(10) Patent No.: US 8,182,919 B2
(45) Date of Patent: *May 22, 2012

(54) CARBON BLACK POLYMERIC INTERMEDIATE TRANSFER MEMBERS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 345 days.

This patent is subject to a terminal disclaimer.

(21) Appl. No.: 12/550,589

(22) Filed: Aug. 31, 2009

(65) Prior Publication Data

US 2011/0052840 A1  Mar. 3, 2011

(51) Int. Cl.
*B32B 27/08* (2006.01)
*B32B 27/18* (2006.01)
*B32B 27/36* (2006.01)
*G03G 15/14* (2006.01)

(52) U.S. Cl. ..... 428/412; 428/421; 428/422; 428/473.5; 428/474.4; 428/480; 399/308

(58) Field of Classification Search .......... None
See application file for complete search history.

(56) References Cited

U.S. PATENT DOCUMENTS

| | | | |
|---|---|---|---|
| 5,487,707 A | 1/1996 | Sharf et al. | |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,500,537 B1 * | 12/2002 | Araki et al. | 428/355 EN |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 7,976,935 B2 | 7/2011 | Wu et al. | |
| 2001/0016531 A1 * | 8/2001 | Morikoshi et al. | 474/237 |
| 2011/0052854 A1 | 3/2011 | Wu et al. | |
| 2011/0053070 A1 | 3/2011 | Wu et al. | |

OTHER PUBLICATIONS

SABIC Innovative Plastics Datasheet for LNP Stat-loy Compound 63000CTC, Aug. 2007.*
Jin Wu, U.S. Appl. No. 12/129,995 on Polyimide Intermediate Transfer Components, filed May 30, 2008.
Jin Wu, U.S. Appl. No. 12/413,645 entitled Layered Intermediate Transfer Members, filed Mar. 30, 2009.
Jin Wu et al., U.S. Appl. No. 12/413,783 entitled Glycoluril Resin and Polyol Resin Members, filed Mar. 30, 2009.
Jin Wu et al., U.S. Appl. No. 12/200,147 entitled Coated Seamed Transfer Member, filed Aug. 28, 2008.
Jin Wu et al., U.S. Appl. No. 12/200,179 entitled Coated Transfer Member, filed Aug. 28, 2008.

* cited by examiner

*Primary Examiner* — Ramsey Zacharia

(74) *Attorney, Agent, or Firm* — Eugene O. Palazzo

(57) ABSTRACT

An intermediate transfer member that contains a mixture of carbon black, and as a dispersant for the carbon black a copolymer of a polyester, a polycarbonate and a polyalkylene glycol, such as a polyethylene glycol, and further including an optional second polymer.

28 Claims, No Drawings

CARBON BLACK POLYMERIC INTERMEDIATE TRANSFER MEMBERS

CROSS REFERENCE TO RELATED APPLICATIONS

U.S. application Ser. No. 12/550,486, U.S. Publication No. 20110052854, filed Aug. 31, 2009, on Glycoluril Resin and Acrylic Resin Members, the disclosure of which is totally incorporated herein by reference, illustrates a process which comprises providing a flexible belt having at least one welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a resin mixture of a glycoluril resin and an acrylic resin.

U.S. application Ser. No. 12/550,492, U.S. Publication No. 20110053070, filed Aug. 31, 2009, on Glycoluril Resin and Acrylic Resin Dual Members, the disclosure of which is totally incorporated herein by reference, illustrates a process which comprises providing a flexible belt having at least one welded seam extending from one parallel edge to the other parallel edge of the belt, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and an acrylic resin.

Disclosed in U.S. application Ser. No. 12/550,594, now U.S. Pat. No. 7,976,935, filed Aug. 31, 2009, is an intermediate transfer member comprised of a supporting substrate and a carbon nanotube layer, and where this member may also include carbon black.

Illustrated in U.S. application Ser. No. 12/129,995, now U.S. Pat. No. 8,005,410, filed May 30, 2008, entitled Polyimide Intermediate Transfer Components, the disclosure of which is totally incorporated herein by reference, is an intermediate transfer belt comprised of a substrate comprising a polyimide and a conductive component like carbon black, where the polyimide is cured at a temperature of, for example, from about 175° C. to about 290° C. over a period of time of from about 10 to about 120 minutes.

U.S. application Ser. No. 12/413,645, now U.S. Pat. No. 7,910,183, filed Mar. 30, 2009, entitled Layered Intermediate Transfer Members, the disclosure of which is totally incorporated herein by reference, illustrates an intermediate transfer member comprised of a polyimide substrate, and thereover a polyetherimide/polysiloxane.

Illustrated in copending U.S. application Ser. No. 12/413,783, U.S. Publication No. 20100248107, filed Mar. 30, 2009, Glycoluril Resin and Polyol Resin Members, the disclosure of which is totally incorporated herein by reference, is an intermediate transfer member comprised of a seamed substrate, and wherein the seam is coated with a mixture of a glycoluril resin and a polyol resin.

Illustrated in U.S. application Ser. No. 12/200,147, U.S. Publication No. 20100055328, filed Aug. 28, 2008, entitled Coated Seamed Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179, now U.S. Pat. No. 8,068,776, filed Aug. 28, 2008, entitled Coated Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

BACKGROUND

Disclosed are intermediate transfer members, and more specifically, intermediate transfer members useful in transferring images such as a developed image in an electrostatographic, for example xerographic, including digital, image on image, and the like, machines or apparatuses, and printers. In embodiments, there are selected intermediate transfer members comprised of a single layer or a dual layer with a supporting substrate, such as a polyimide layer, and a second layer of carbon black mixed with a dispersant. More specifically, there is disclosed herein an intermediate transfer member, such as an intermediate transfer belt (ITB), comprised of carbon black dispersed in a copolymer of a polyester, a polycarbonate, and a polyethylene glycol, which copolymer is commercially available as LNP STAT-LOY 63000CTC from SABIC Innovative Plastics. In embodiments, a specific dispersant copolymer is comprised of about 62 parts of a polyester formed, for example, by the mixing of a trans-1,4-cyclohexanedicarboxylic acid and a trans/cis mixture of 1,4-cyclohexanedimethanol, about 33 parts of a polycarbonate, such as polycarbonate A, and at about 5 parts of a polyethylene glycol.

The carbon black containing mixture, in embodiments, has further included therein an optional second polymer selected, for example, from a polyimide (thermosetting or thermoplastic), a polycarbonate, a polyamideimide, a polyphenylene sulfide, a polyamide, a polysulfone, a polyetherimide, a polyester, a PVDF, a polyethylene-co-polytetrafluoroethylene, and their copolymers, and mixtures thereof.

A number of advantages are associated with the intermediate transfer members of the present disclosure in embodiments thereof, such as increasing the conductivity of carbon black as compared to a number of similar members that exclude the polymer mixture illustrated herein; permitting the use of minimal amounts, when desired, of carbon black such as from about 0.5 to about 2.5 weight percent to achieve an ITB resistivity range of, for example, from about $10^8$ to about $10^{13}$ ohm/sq.

In embodiments of the present disclosure, there are provided intermediate transfer members that are believed to possess excellent mechanical characteristics; robustness; consistent, and excellent surface resistivities; excellent image transfer (toner transfer and cleaning); acceptable adhesion properties, when there is included in the plural layered intermediate transfer member an adhesive layer; excellent maintained conductivity or resistivity for extended time periods;

dimensional stability; humidity insensitivity for extended time periods; low and acceptable surface friction characteristics; and minimum or substantially no peeling or separation of the layers.

In a typical electrostatographic reproducing apparatus, such as xerographic copiers, printers, and multifunctional machines, a light image of an original to be copied is recorded in the form of an electrostatic latent image upon a photosensitive member or a photoconductor, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently, transfer with a high transfer efficiency the developed image from the intermediate transfer member to a permanent substrate. The toner image is subsequently usually fixed or fused upon a support, which may be the photosensitive member itself, or other support sheet such as plain paper.

Intermediate transfer members possess a number of advantages, such as enabling high throughput at modest process speeds; improving registration of the final color toner image in color systems using synchronous development of one or more component colors, and using one or more transfer stations; and increasing the number of substrates that can be selected. However, a disadvantage of using an intermediate transfer member and belt (ITB) is that a plurality of transfer operations is usually needed allowing for the possibility of charge exchange occurring between toner particles and the transfer member, which ultimately can lead to less than complete toner transfer, resulting in low resolution images on the image receiving substrate, and image deterioration. When the image is in color, the image can additionally suffer from color shifting and color deterioration.

Attempts at controlling the resistivity of intermediate transfer members by, for example, adding conductive fillers, such as ionic additives and/or carbon black to the outer layer, are disclosed in U.S. Pat. No. 6,397,034 which describes the use of fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties, and poor mechanical properties.

In addition, the ionic additives themselves are sensitive to changes in temperature, humidity, and operating time. These sensitivities often limit the ITB resistivity range. For example, the ITB resistivity usually decreases by up to two orders of magnitude or more as the humidity increases from about 20 to about 80 percent relative humidity; which effect limits the operational or process latitude.

Moreover, ion transfer can also occur in these systems, wherein this transfer leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use.

Therefore, it is desired to provide an intermediate transfer member with a number of the advantages illustrated herein, such as excellent mechanical, and humidity insensitivity characteristics, permitting high copy quality where developed images with minimal resolution issues can be obtained. It is also desired to provide a weldable intermediate transfer belt that may not, but could, have puzzle cut seams, and instead has a weldable seam, thereby providing a belt that can be manufactured without labor intensive steps, such as manually piecing together the puzzle cut seam with fingers, and without the lengthy high temperature and high humidity conditioning steps.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

EMBODIMENTS

In aspects thereof, there is disclosed an intermediate transfer member comprised of a mixture of carbon black, a first polymer comprised of a polyester, a polycarbonate and a polyalkylene glycol, and a second polymer; an intermediate transfer member comprised of carbon black dispersed in a copolymer comprised of a polyester, a polycarbonate, and a polyethylene glycol, and wherein the copolymer is attached to the carbon black by hydrogen bonding, and wherein the copolymer possesses a weight average molecular weight of from about 50,000 to about 150,000, and a number average molecular weight of from about 8,000 to about 50,000; an intermediate transfer member comprised of a mixture of carbon black and a copolymer of a polyester, a polycarbonate and a polyalkylene glycol, and wherein the polyester is present in an amount of from about 50 to about 70 weight percent; the polycarbonate is present in an amount of from about 30 to about 40 weight percent, and the polyalkylene glycol is present in an amount of from about 3 to about 10 weight percent of the copolymer, and wherein the total of the copolymer components is about 100 percent; a transfer media comprised of carbon black dispersed in or added to copolymers of a polyester, a polycarbonate, and a polyalkylene glycol such as a polyethylene glycol or a polypropylene glycol; an intermediate transfer member comprised of a polyimide first supporting substrate layer and thereover a second layer comprised of a mixture of carbon black and a copolymer of a polyester, a polycarbonate, and a polyethylene glycol; an intermediate transfer member where the substrate layer further includes a conductive component, and wherein the substrate is of a thickness of from about 20 to about 500 microns, and the carbon black polymer mixture dispersant layer is of a thickness of from about 1 to about 150 microns, and wherein the total of the components in the mixture layer is about 100 percent; an intermediate transfer member comprising, for example, a mixture of carbon black and a copolymer of a polyester, a polycarbonate, a polyethylene glycol, and a second polymer selected, for example, from the group consisting of a polyimide, a polycarbonate, a polyamideimide, a polyphenylene sulfide, a polyamide, a polysulfone, a polyetherimide, a polyester, a polyvinylidene fluoride, a polyethylene-co-polytetrafluoroethylene, copolymers thereof, and mixtures thereof, each present in an amount of from about 60 to about 99 weight percent, or from about 80 to about 95 weight percent.

Examples of the first polymer which, in embodiments, functions primarily as a dispersant selected for the carbon black comprises copolymers of a polyester, a polycarbonate, and a polyalkylene glycol, wherein the polyester is present in an amount of, for example, from about 30 to about 80 weight percent, or from about 50 to about 70 weight percent; the polycarbonate is present, for example, in an amount of from about 10 to about 50 weight percent, or from about 30 to about 40 weight percent; and the polyalkylene glycol is present, for example, in an amount of from about 1 to about 20 weight percent, or from about 3 to about 10 weight percent, and the total of the copolymer components is 100 percent.

The polyester component, which is commercially available, of the disclosed polymer, and more specifically, the disclosed copolymer, is formed, for example, by reacting a dicarboxylic acid or its dialkyl ester with a diol. Examples of the dicarboxylic acid or its dialkyl ester include 1,4-cyclohexanedicarboxylic acid or its dimethyl ester dimethyl 1,4-cyclohexanedicarboxylate, terephthalic acid or its dimethyl ester dimethyl terephthalate, adipic acid or its dimethyl ester dimethyl adipate, and the like. Examples of the diol include 1,4-cyclohexanedimethanol, ethylene glycol, propylene glycol, butylene glycol, and the like. A specific polyester component selected is a polyester formed, for example, by the reaction of trans-1,4-cyclohexanedicarboxylic acid and a trans/cis mixture of 1,4-cyclohexanedimethanol, terephthalic acid and ethylene glycol, or the reaction of adipic acid, ethylene glycol, and a trans/cis mixture of 1,4-cyclohexanedimethanol.

The polycarbonate component of the disclosed copolymer includes, for example, poly(4,4'-isopropylidene-diphenylene)carbonate (also referred to as bisphenol-A-polycarbonate, or polycarbonate A), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like.

The polyalkylene glycol component of the disclosed copolymer is, for example, a polyethylene glycol, a polypropylene glycol, a polybutylene glycol, and the like, and wherein alkylene contains, for example, from about 2 to about 12 carbon atoms, or from about 1 to about 6, and 2 to about 4 carbon atoms.

Specific examples of the copolymer include a copolymer comprising 62 parts of the polyester (formed from trans-1,4-cyclohexanedicarboxylic acid and trans/cis mixture of 1,4-cyclohexanedimethanol), 33 parts of polycarbonate A, and 5 parts of polyethylene glycol (LNP STAT-LOY 63000CTC obtained from SABIC Innovative Plastics). While not being desired to be limited by theory, it is believed that the copolymer forms a strong interaction with carbon black via surface hydrogen bonding, thus improving the carbon black dispersion, which results in excellent conductivity.

The disclosed polymeric dispersant is present in an amount of, for example, from about 0.5 to about 20 weight percent, from about 1 to 10 weight percent, or from about 2 to 5 weight percent of the intermediate transfer member components.

Carbon black may be present in the intermediate transfer member in, for example, an amount of from about 0.1 to about 30 weight percent, from about 0.5 to about 10 weight percent, or specifically from about 1 to about 5 weight percent.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is dependent on surface area and its structure primarily. Generally, the higher the surface area and the higher the structure, the more conductive is the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected for the intermediate transfer member illustrated herein include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m²/g, DBP absorption=1.14 ml/g), BLACK PEARLS® 170 (B.E.T. surface area=35 m²/g, DBP absorption=1.22 ml/g), VULCAN® XC72 (B.E.T. surface area=254 m²/g, DBP absorption=1.76 ml/g), VULCAN® XC72R (fluffy form of VULCAN® XC72), VULCAN® XC605, VULCAN® XC305, REGAL® 660 (B.E.T. surface area=112 m²/g, DBP absorption=0.59 ml/g), REGAL® 400 (B.E.T. surface area=96 m²/g, DBP absorption=0.69 ml/g), REGAL® 330 (B.E.T. surface area=94 m²/g, DBP absorption=0.71 ml/g), MONARCH® 880 (B.E.T. surface area=220 m²/g, DBP absorption=1.05 ml/g, primary particle diameter=16 nanometers), and MONARCH® 1000 (B.E.T. surface area=343 m²/g, DBP absorption=1.05 ml/g, primary particle diameter=16 nanometers); Channel carbon blacks available from Evonik-Degussa; Special Black 4 (B.E.T. surface area=180 m²/g, DBP absorption=1.8 ml/g, primary particle diameter=25 nanometers), Special Black 5 (B.E.T. surface area=240 m²/g, DBP absorption=1.41 ml/g, primary particle diameter=20 nanometers), Color Black FW1 (B.E.T. surface area=320 m²/g, DBP absorption=2.89 ml/g, primary particle diameter=13 nanometers), Color Black FW2 (B.E.T. surface area=460 m²/g, DBP absorption=4.82 ml/g, primary particle diameter=13 nanometers), and Color Black FW200 (B.E.T. surface area=460 m²/g, DBP absorption=4.6 ml/g, primary particle diameter=13 nanometers).

Examples of the second optional polymer present in the intermediate transfer member include rapidly cured polyimide polymers, such as for example, VTEC™ PI 1388, 080-051, 851, 302, 203, 201 and PETI-5, all available from Richard Blaine International, Incorporated, Reading, Pa. These thermosetting polyimides, which are cured at suitable temperatures, and more specifically, from about 180° C. to about 260° C. over a short period of time, such as, for example, from about 10 to about 120 minutes, and from about 20 to about 60 minutes, possess, for example, a number average molecular weight of from about 5,000 to about 500,000, or from about 10,000 to about 100,000, and a weight average molecular weight of from about 50,000 to about 5,000,000, or from about 100,000 to about 1,000,000. Also, there can be selected as the second polymer thermosetting polyimide precursors that are usually cured at higher temperatures (above 300° C.) than the VTEC™ PI polyimide precursors, and which higher temperature cured precursors include, for example, PYRE-M.L® RC-5019. RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, commercially available from E.I. DuPont, Wilmington, Del.; and present, for example, in amounts of, for example, of from about 70 to about 97 weight percent, or from about 80 to about 95 weight percent of the intermediate transfer member components.

Examples of specific thermoplastic polyimide polymers selected as the second polymer are KAPTON® KJ, commercially available from E.I. DuPont, Wilmington, Del., as represented by

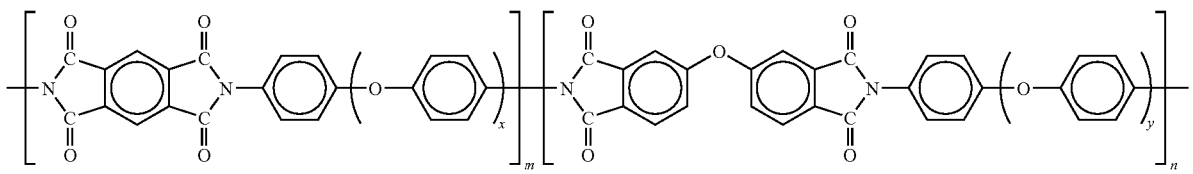

wherein x represents the number of segments, such as being equal to 2; y represents the number of segments, such as being equal to 2; m and n are from about 10 to about 300; and IMIDEX®, commercially available from West Lake Plastic Company, as represented by

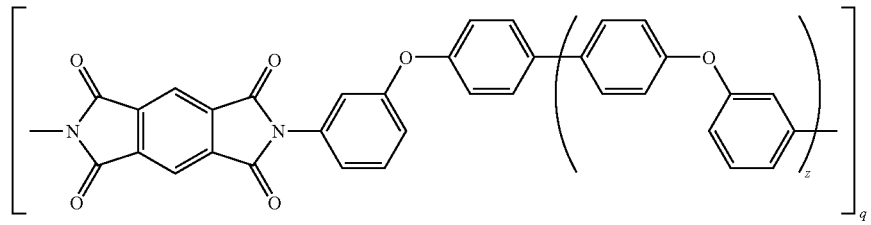

wherein z is equal to 1, and q is from about 10 to about 300, and present, for example, in amounts of, for example, of from about 70 to about 97 weight percent, or from about 80 to about 95 weight percent of the intermediate transfer member components.

Examples of polycarbonates selected as the second polymer include, for example, poly(4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, the intermediate transfer member second polymer is comprised of bisphenol-A-polycarbonate resins, commercially available as MAKROLON®, with, for example, a weight average molecular weight of from about 50,000 to about 500,000, from about 100,000 to about 225,000, and present, for example, in amounts of, for example, from about 70 to about 97 weight percent, or from about 80 to about 95 weight percent of the intermediate transfer member components.

Specific examples of supporting substrates include polyimides, polyamideimides, polyetherimides, and mixtures thereof.

More specifically, examples of intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can cured at temperatures of above 300° C. such as PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

In embodiments, suitable supporting substrate polyimides include those formed from various diamines and dianhydrides, such as polyimide, polyamideimide, polyetherimide, and the like. More specifically, polyimides include aromatic polyimides, such as those formed by reacting pyromellitic acid and diaminodiphenylether, or by imidization of copolymeric acids, such as biphenyltetracarboxylic acid and pyromellitic acid with two aromatic diamines, such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane. Aromatic polyimides include those containing 1,2,1',2'-biphenyltetracarboximide and para-phenylene groups, and those having biphenyltetracarboximide functionality with diphenylether end spacer characterizations. Mixtures of polyimides can also be used.

In embodiments, the polyamideimides supporting substrate can be synthesized by at least the following two methods (1) isocyanate method which involves the reaction between isocyanate and trimellitic anhydride; or (2) acid chloride method where there is reacted a diamine and trimellitic anhydride chloride. Examples of the polyamideimides include VYLOMAX® HR-11NN (15 weight percent solution in N methylpyrrolidone, Tg=300° C., and $M_w$=45,000); HR-12N2 (30 weight percent solution in N-methylpyrrolidone/xylene/methyl ethyl ketone=50/35/15, Tg=255° C., and $M_w$=8,000); HR-13NX (30 weight percent solution in N-methylpyrrolidone/xylene=67/33, Tg=280° C., and $M_w$=10,000); HR-15ET (25 weight percent solution in ethanol/toluene=50/50, Tg=260° C., and $M_w$=10,000); HR-16NN (14 weight percent solution in N-methylpyrrolidone, Tg=320° C., and $M_w$=100,000), all commercially available from Toyobo Company of Japan; and TORLON® Al-10 (Tg=272° C.), commercially available from Solvay Advanced Polymers, LLC, Alpharetta, Ga.

The carbon black, the polymeric dispersant, and the second polymer are usually formed into a dispersion in a solvent that with proper milling processes provides uniform dispersions which are then coated on glass plates using a draw bar coating method. The resulting individual films can be dried at high temperatures, such as from about 100° C. to about 400° C., for a suitable period of time, such as from about 20 to about 180 minutes, while remaining on separate glass plates. After drying and cooling to room temperature, about 23° C. to about 25° C., the films on the glass plates can be immersed into water overnight, about 18 to 23 hours, and subsequently, 50 to 150 micron thick films can be released from the glass to form a functional intermediate transfer member.

Adhesive layer components usually situated between the supporting substrate, and the carbon black copolymer mixture layer thereover are, for example, a number of resins or polymers of epoxy, urethane, silicone, polyester, and the like. Generally, the adhesive layer is a solventless layer, that is materials that are liquid at room temperature (about 25° C.), and are able to crosslink to an elastic or rigid film to adhere at least two materials together. Specific adhesive layer components include 100 percent solids adhesives including polyurethane adhesives obtained from Lord Corporation, Erie, Pa., such as TYCEL® 7924 (viscosity from about 1,400 to about 2,000 cps), TYCEL® 7975 (viscosity from about 1,200 to about 1,600 cps) and TYCEL® 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or any other known technique. The thickness of the adhesive layer is usually less than about 100 nanometers, and more specifically, as illustrated hereinafter.

Optional release layer examples situated on and in contact with the carbon black copolymer mixture include low surface energy materials, such as TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®-like materials; silicone materials such as fluorosilicones and silicone rubbers such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with, for example, a molecular weight $M_w$ of approximately 3,500); and fluoroelastomers such as those available as VITON® such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, and hexafluoropropylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, and the like. The release layer thickness is from about 1 to about 50 microns, or from about 10 to about 30 microns.

Known methods for forming the release layer on the substrate film, such as dipping, spraying, such as by multiple spray applications of very thin films, casting, flow coating, web coating, roll coating, extrusion, molding, or the like, can be used. In embodiments, the release layer or layers can be deposited or generated by spraying, such as by multiple spray applications of thin films, by casting, by web coating, by flow coating, and most preferably, by laminating.

The circumference of the intermediate transfer member, especially as it is applicable to a film or a belt configuration, is, for example, from about 250 to about 2,500 millimeters, from about 1,500 to about 3,000 millimeters, or from about 2,000 to about 2,200 millimeters with a corresponding width of, for example, from about 100 to about 1,000 millimeters, from about 200 to about 500 millimeters, or from about 300 to about 400 millimeters.

The thickness of each layer of the intermediate transfer member can vary, and is usually not limited to any specific value. In specific embodiments, the substrate layer, when present, thickness is, for example, from about 20 to about 300 microns, from about 30 to about 200 microns, from about 75 to about 150 microns, and from about 50 to about 100 microns, while the thickness of the top carbon black dispersant layer is, for example, from about 1 to about 150 microns, from about 10 to about 100 microns, from about 20 to about 70 microns, and from about 30 to about 50 microns. The adhesive layer thickness is, for example, from about 1 to about 100 nanometers, from about 5 to about 75 nanometers, or from about 50 to about 100 nanometers.

The disclosed intermediate transfer members are, in embodiments, weldable, that is the seam of the member like a belt is weldable, and more specifically, may be ultrasonically welded to produce a seam. The surface resistivity of the disclosed intermediate transfer member is, for example, from about $10^8$ to about $10^{13}$ ohm/sq, or from about $10^9$ to about $10^{12}$ ohm/sq. The sheet resistivity of the intermediate transfer weldable member is, for example, from about $10^8$ to about $10^{13}$ ohm/sq, or from about $10^9$ to about $10^{12}$ ohm/sq.

The intermediate transfer members illustrated herein like intermediate transfer belts can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

Subsequent to the toner latent image being transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer, or it can be comprised of several layers, such as from about 2 to about 5 layers.

Specific embodiments will now be described in detail. These examples are intended to be illustrative, and are not limited to the materials, conditions, or process parameters set forth in these embodiments. All parts are percentages by weight of total solids unless otherwise indicated.

Comparative Example 1

A single layer comparative intermediate transfer member was prepared as follows. One tenth gram of Color Black FW1 (B.E.T. surface area of 320 m$^2$/g, DBP absorption of 2.89 ml/g, primary particle diameter of 13 nanometers) as obtained from Evonik-Degussa, was mixed with 9.9 grams of MAKROLON® 5705, a known polycarbonate resin having a $M_w$ molecular weight average of from about 50,000 to about 100,000, commercially available from Farbenfabriken Bayer A.G., and 100 grams of methylene chloride. By ball milling this mixture with 2 millimeter stainless shot overnight, or 23 hours, a uniform dispersion was obtained.

The resulting dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 5 minutes while remaining on the PEN substrate. After drying and cooling to room temperature, about 25° C., the film on the PEN substrate was automatically released from the substrate resulting in a 75 micron thick intermediate transfer member of the above carbon black/polycarbonate with a ratio by weight of 1/99.

Comparative Example 2

A second single layer comparative intermediate transfer member was prepared as follows. Two tenths gram of Color Black FW1 (B.E.T. surface area of 320 m$^2$/g, DBP absorption of 2.89 ml/g, primary particle diameter of 13 nanometers) as obtained from Evonik-Degussa, was mixed with 9.8 grams of MAKROLON® 5705, a known polycarbonate resin having a $M_w$ molecular weight average of from about 50,000 to about 100,000, commercially available from Farbenfabriken Bayer A.G., and 100 grams of methylene chloride. By ball milling this mixture with 2 millimeter stainless shot overnight, about 23 hours, a uniform dispersion was obtained.

The dispersion resulting was then coated on a biaxially oriented poly(ethylene naphthalate) (PEN) substrate (KALEDEX™ 2000) having a thickness of 3.5 mils using known draw bar coating methods. The resulting film was dried at about 120° C. for 5 minutes while remaining on the PEN substrate. After drying and cooling to room temperature, the film on the PEN substrate was automatically released from the substrate resulting in a 75 micron thick intermediate transfer member of carbon black/polycarbonate with a ratio by weight of 2/98.

Example I

A single layer intermediate transfer member was prepared as follows. One tenth gram of Color Black FW1 (B.E.T. surface area of 320 m$^2$/g, DBP absorption of 2.89 ml/g, primary particle diameter of 13 nanometers) as obtained from Evonik-Degussa, was mixed with 0.2 gram of the polymeric dispersant comprised of a copolymer comprising 62 parts of a polyester (formed from trans-1,4-cyclohexanedicarboxylic acid and a trans/cis mixture of 1,4-cyclohexanedimethanol), 33 parts of polycarbonate A (bisphenol-A-polycarbonate), and 5 parts of polyethylene glycol (LNP STAT-LOY 63000CTC obtained from SABIC Innovative Plastics), and 9.7 grams of MAKROLON® 5705, a known polycarbonate resin having a $M_w$ molecular weight average of from about 50,000 to about 100,000, commercially available from Farbenfabriken Bayer A.G., and 100 grams of methylene chloride. By ball milling this mixture with 2 millimeter stainless shot overnight, about 23 hours, a uniform dispersion was obtained.

The above obtained dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 5 minutes while remaining on the PEN substrate. After drying and cooling to room temperature, about 23° C., the film on the PEN substrate was automatically released from the substrate resulting in a 75 micron thick intermediate transfer member of the above carbon black/polymeric dispersant/polycarbonate (MAKROLON® 5705) with a ratio by weight of 1/2/97.

Example II

A single layer intermediate transfer member was prepared as follows. Two tenths gram of Color Black FW1 (B.E.T. surface area=320 m²/g, DBP absorption=2.89 ml/g, primary particle diameter=13 nanometers) as obtained from Evonik-Degussa, was mixed with 0.2 gram of the polymeric dispersant comprised of a copolymer comprising 62 parts of a polyester (formed from trans-1,4-cyclohexanedicarboxylic acid and a trans/cis mixture of 1,4-cyclohexanedimethanol), 33 parts of polycarbonate A and 5 parts of polyethylene glycol (LNP STAT-LOY 63000CTC obtained from SABIC Innovative Plastics), and 9.6 grams of MAKROLON® 5705, a known polycarbonate resin having a $M_w$ molecular weight average of from about 50,000 to about 100,000, commercially available from Farbenfabriken Bayer A.G., and 100 grams of methylene chloride. By ball milling this mixture with 2 millimeter stainless shot overnight, about 23 hours, a uniform dispersion was obtained.

The above obtained dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 5 minutes while remaining on the PEN substrate. After drying and cooling to room temperature, about 23° C., the film on the PEN substrate was automatically released from the substrate resulting in a 75 micron thick intermediate transfer member of the above carbon black/polymeric dispersant/polycarbonate with a ratio by weight of 2/2/96.

Surface Resistivity Measurement

The above ITB members or devices of Examples I and II, and Comparative Examples 1 and 2 were measured for surface resistivity (averaging four to six measurements at varying spots, 72° F./65 percent room humidity) using a High Resistivity Meter (Hiresta-Up MCP-HT450 from Mitsubishi Chemical Corp.). The results are provided in Table 1.

TABLE 1

| | Surface Resistivity (ohm/sq) |
|---|---|
| Comparative Example 1, Carbon Black/Polycarbonate = 1/99 | $1 \times 10^{15}$ |
| Comparative Example 1, Carbon Black/Polycarbonate = 2/98 | $1 \times 10^{15}$ |
| Example I, Carbon Black/Dispersant/Polycarbonate = 1/2/97 | $4.4 \times 10^{11}$ |
| Example II, Carbon Black/Dispersant/Polycarbonate = 2/2/96 | $9.4 \times 10^{9}$ |

With the presence of the disclosed polymeric dispersant, about 1 or 2 weight percent of carbon black provided a resistivity of from about $10^9$ to about $10^{11}$ ohm/sq (Examples I and II). In contrast, Comparative Examples 1 and 2, without the presence of the polymeric dispersant, about 1 or 2 weight percent of carbon black was insufficient to achieve the desired functional surface resistivity range for the disclosed intermediate transfer members.

Incorporation of the polymeric dispersant improved the conductivity of carbon black, thus enabled the use of less carbon black in the ITB, which is generally thought to be desirable for ITB mechanical properties, and less contamination to the printer since less conductive ITB debris are generated during printing.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting essentially of an optional supporting substrate, a mixture of carbon black, a first copolymer comprised of a polyester, a polycarbonate and a polyalkylene glycol, and a second polymer wherein said carbon black is present in an amount of from about 0.1 to about 30 weight percent; said first copolymer is present in an amount of from about 0.5 to about 20 weight percent; and said second polymer is present in an amount of from about 60 to about 99 weight percent, wherein the total is about 100 percent, and wherein said alkylene of said polyalkylene glycol has from about 2 to about 6 carbon atoms, and wherein said polyester is formed by reacting a diol with a dicarboxylic acid or its dialkyl ester, and wherein said dicarboxylic acid or its dialkyl ester is selected from the group consisting of 1,4-cyclohexanedicarboxylic acid, its dimethyl ester dimethyl 1,4-cyclohexanedicarboxylate, terephthalic acid or its dimethyl ester dimethyl terephthalate, and adipic acid or its dimethyl ester dimethyl adipate, and an optional outer release layer.

2. An intermediate transfer member in accordance with claim 1 wherein said diol is selected from the group consisting of 1,4-cyclohexanedimethanol, ethylene glycol, propylene glycol, and butylene glycol, and wherein said dicarboxylic acid is 1,4-cyclohexanedicarboxylic acid.

3. An intermediate transfer member in accordance with claim 1 wherein said polyester is formed by the reaction of a trans-1,4-cyclohexanedicarboxylic acid and a trans/cis mixture of 1,4-cyclohexanedimethanol, with terephthalic acid and ethylene glycol.

4. An intermediate transfer member in accordance with claim 1 wherein said polycarbonate is poly(4,4'-isopropylidene-diphenylene)carbonate, poly(4,4'-cyclohexylidine diphenylene)carbonate, or poly(4,4'-isopropylidene-3,3'-dimethyldiphenyl)carbonate.

5. An intermediate transfer member in accordance with claim 1 wherein said polyalkylene glycol is polyethylene glycol.

6. An intermediate transfer member in accordance with claim 1 wherein said polyalkylene glycol is polypropylene glycol, or polybutylene glycol.

7. An intermediate transfer member in accordance with claim 1 wherein said polyester is present in an amount of from about 30 to about 80 weight percent; said polycarbonate is present in an amount of from about 10 to about 50 weight percent; and said polyalkylene glycol is present in an amount of from about 1 to about 20 weight percent of said first polymer, and the total thereof is about 100 percent.

8. An intermediate transfer member in accordance with claim 1 wherein said polyester is present in an amount of from about 50 to about 70 weight percent; said polycarbonate is present in an amount of from about 30 to about 40 weight percent; and said polyalkylene glycol is present in an amount of from about 3 to about 10 weight percent of said first polymer, and wherein the total thereof of said components is about 100 percent; and wherein said first polymer functions as a dispersant for said carbon black.

9. An intermediate transfer member in accordance with claim 1 wherein said second polymer is selected from the group consisting of a polyimide, a polycarbonate, a polyamideimide, a polyphenylene sulfide, a polyamide, a polysulfone, a polyetherimide, a polyester, a polyethylene-co-polytetrafluoroethylene, and mixtures thereof.

10. An intermediate transfer member in accordance with claim 1 wherein said carbon black is present in an amount of from about 0.5 to about 10 weight percent; said first copolymer is present in an amount of from about 1 to about 10 weight percent; and said second polymer is present in an amount of from about 80 to about 95 weight percent of said member, and wherein the total thereof is about 100 percent.

11. An intermediate transfer member in accordance with claim 1 wherein said first copolymer consists essentially of from about 50 to about 70 weight percent of said polyester, from about 20 to about 40 weight percent of said polycarbonate of poly(4,4'-isopropylidene-diphenylene)carbonate, and from about 1 to about 10 weight percent of said polyalkylene glycol of polyethylene glycol, and wherein the total thereof is about 100 percent.

12. An intermediate transfer member in accordance with claim 1 wherein said first copolymer possesses a number average molecular weight of from about 3,000 to about 100,000, and a weight average molecular weight of from about 7,000 to about 150,000; and wherein said first copolymer functions as a dispersant for said carbon black.

13. An intermediate transfer member in accordance with claim 1 wherein said first copolymer possesses a number average molecular weight of from about 8,000 to about 50,000, and a weight average molecular weight of from about 20,000 to about 100,000.

14. An intermediate transfer member in accordance with claim 1 with a surface resistivity of from about $10^8$ to about $10^{13}$ ohm/sq.

15. An intermediate transfer member in accordance with claim 1 wherein said outer release layer is positioned on said carbon black, and said first copolymer said second polymer mixture.

16. An intermediate transfer member in accordance with claim 15 wherein said outer release layer consists essentially of a fluorinated ethylene propylene copolymer, a polytetrafluoroethylene, a polyfluoroalkoxy polytetrafluoroethylene, a fluorosilicone, a polymer of vinylidenefluoride, hexafluoropropylene and tetrafluoroethylene, or mixtures thereof.

17. An intermediate transfer member in accordance with claim 1 wherein said supporting substrate is present.

18. An intermediate transfer member in accordance with claim 17 wherein said substrate is a polyimide, a polyetherimide, or a polyamideimide.

19. An intermediate transfer member in accordance with claim 1 wherein said polycarbonate is poly(4,4'-isopropylidene-diphenylene)carbonate, poly(4,4'-cyclohexylidine diphenylene)carbonate, or poly(4,4'-isopropylidene-3,3'-dimethyldiphenyl)carbonate, and said polyalkylene glycol is a polyethylene glycol or a polypropylene glycol.

20. An intermediate transfer member consisting of an optional supporting substrate, carbon black dispersed in a copolymer of a polyester, a polycarbonate, and a polyethylene glycol, and wherein said copolymer is attached to said carbon black by hydrogen bonding, and wherein said copolymer possesses a weight average molecular weight of from about 50,000 to about 150,000, and a number average molecular weight of from about 8,000 to about 50,000, and a second polymer, wherein said carbon black is present in an amount of from about 0.1 to about 30 weight percent; said copolymer is present in an amount of from about 0.5 to about 20 weight percent; and said second polymer is present in an amount of from about 60 to about 99 weight percent, wherein the total is about 100 percent, and wherein said polyester is formed by reacting a diol with a dicarboxylic acid selected from the group consisting of 1,4-cyclohexanedicarboxylic acid, dimethyl 1,4-cyclohexanedicarboxylate, terephthalic acid, dimethyl terephthalate, adipic acid, and dimethyl adipate, and an optional adhesive layer.

21. An intermediate transfer member in accordance with claim 20 wherein said supporting substrate is present.

22. An intermediate transfer member in accordance with claim 21 wherein situated between said substrate and said copolymer in the form of a layer is said adhesive layer.

23. An intermediate transfer member in accordance with claim 20 wherein said polycarbonate is poly(4,4'-isopropylidene-diphenylene)carbonate, poly(4,4'-cyclohexylidine diphenylene)carbonate, or poly(4,4'-isopropylidene-3,3'-dimethyldiphenyl)carbonate.

24. An intermediate transfer member in accordance with claim 23 wherein said polycarbonate is poly(4,4'-isopropylidene-diphenylene)carbonate.

25. An intermediate transfer member consisting of an optional supporting substrate, a mixture of a polymer, carbon black and a copolymer of a polyester, a polycarbonate and a polyalkylene glycol, wherein said alkylene of said polyalkylene glycol wherein said carbon black is present in an amount of from about 0.1 to about 30 weight percent; said copolymer is present in an amount of from about 0.5 to about 20 weight percent; and said polymer is present in an amount of from about 60 to about 99 weight percent, wherein the total is about 100 percent, and has from about 2 to about 6 carbon atoms, and wherein said polyester is present in an amount of from about 50 to about 70 weight percent; said polycarbonate is present in an amount of from about 30 to about 40 weight percent; said polyalkylene glycol is present in an amount of from about 3 to about 10 weight percent of said copolymer, and wherein the total of said copolymer components is about 100 percent, and wherein said polyester is formed by reacting a diol with a dicarboxylic acid.

26. An intermediate transfer member in accordance with claim 25 wherein said polyester is generated by the reaction of trans-1,4-cyclohexanedicarboxylic acid and trans/cis mixture of 1,4-cyclohexanedimethanol, said polycarbonate is poly(4,4'-isopropylidenediphenylene)carbonate, and said glycol is polyethylene glycol.

27. An intermediate transfer member in accordance with claim 25 wherein said supporting substrate is present.

28. An intermediate transfer member in accordance with claim 25 wherein said polycarbonate is poly(4,4'-isopropylidene-diphenylene)carbonate, poly(4,4'-cyclohexylidine diphenylene)carbonate, or poly(4,4'-isopropylidene-3,3'-dimethyldiphenyl)carbonate, and said polyalkylene glycol is a polyethylene glycol or a polypropylene glycol.

* * * * *